US012269461B2

(12) United States Patent
Suh et al.

(10) Patent No.: US 12,269,461 B2
(45) Date of Patent: Apr. 8, 2025

(54) VEHICLE BEHAVIOR CONTROL METHOD, A COMPUTING SYSTEM, AND A VEHICLE SUPPORTING THE SAME

(71) Applicants: HYUNDAI MOTOR COMPANY, Seoul (KR); KIA CORPORATION, Seoul (KR); KOREA UNIVERSITY OF TECHNOLOGY AND EDUCATION INDUSTRY—UNIVERSITY COOPERATION FOUNDATION, Cheonan-si (KR)

(72) Inventors: Jee Yoon Suh, Incheon (KR); Seung Han Yoo, Seoul (KR); Wan Ki Cho, Suwon-si (KR); Chang Jun Jeon, Cheonan-si (KR)

(73) Assignees: HYUNDAI MOTOR COMPANY, Seoul (KR); KIA CORPORATION, Seoul (KR); KOREA UNIVERSITY OF TECHNOLOGY AND EDUCATION INDUSTRY-UNIVERSITY COOPERATION FOUNDATION, Cheonan-si (KR)

( * ) Notice: Subject to any disclaimer, the term of this patent is extended or adjusted under 35 U.S.C. 154(b) by 75 days.

(21) Appl. No.: 18/240,191

(22) Filed: Aug. 30, 2023

(65) Prior Publication Data

US 2024/0351576 A1   Oct. 24, 2024

(30) Foreign Application Priority Data

Apr. 18, 2023   (KR) .......................... 10-2023-0050823

(51) Int. Cl.
*B60W 30/04* (2006.01)
(52) U.S. Cl.
CPC ......... *B60W 30/04* (2013.01); *B60W 2520/16* (2013.01); *B60W 2520/18* (2013.01); *B60W 2520/28* (2013.01)
(58) Field of Classification Search
CPC ............. B60W 30/04; B60W 2520/16; B60W 2520/18; B60W 2520/28; B60W 40/112;
(Continued)

(56) References Cited

U.S. PATENT DOCUMENTS

2021/0221432 A1* 7/2021 Zhang ................. G05D 1/0088

* cited by examiner

*Primary Examiner* — Yufeng Zhang
(74) *Attorney, Agent, or Firm* — Lempia Summerfield Katz LLC

(57) ABSTRACT

A vehicle behavior control method includes: selecting a center of gravity point at which behavior control for a vehicle is to be performed; setting a target roll behavior value and a target pitch behavior value at the selected center of gravity point such that behavior of the selected center of gravity point is less than a predefined reference value; calculating a target roll moment corresponding to the target roll behavior value and a target pitch moment corresponding to the target pitch behavior value; generating a control signal to be transmitted to at least one actuator for following the target roll moment and the target pitch moment; and transmitting the control signal to the at least one actuator to perform control such that the behavior at the selected center of gravity point is less than the predefined reference value.

20 Claims, 11 Drawing Sheets

(58) Field of Classification Search
CPC ............. B60W 30/045; B60W 30/025; B60W 2540/18; B60W 2530/10; B60W 2520/125; B60W 2050/0005; B60W 2040/0881
See application file for complete search history.

VEHICLE BEHAVIOR CONTROL METHOD, A COMPUTING SYSTEM, AND A VEHICLE SUPPORTING THE SAME

CROSS-REFERENCE TO RELATED APPLICATION

This application claims the benefit of priority to Korean Patent Application No. 10-2023-0050823, filed in the Korean Intellectual Property Office on Apr. 18, 2023, the entire contents of which are incorporated herein by reference.

TECHNICAL FIELD

The present disclosure relates to vehicle behavior control, and more particularly, to a technology capable of providing a more comfortable riding experience by controlling the behavior of a vehicle at a specific position.

BACKGROUND

A user's needs related to a vehicle include stably increasing a driving speed and enhancing the riding comfort of a vehicle occupant. In other words, users are requesting to improve the riding comfort of the vehicle while stably increasing the speed of the vehicle. In accordance with this demand, various studies are being conducted to improve the performance of the vehicle while the vehicle is driving on a straight line and a curved line.

On the other hand, it may be easier to improve power, grip, and speed performance on straight roads compared to corners. However, since many functions such as body design, stiffness, suspension, engine, and brake have a complex effect in a curved section rather than a straight section, such as a turning or u-turning section, it may be very complicated to improve related performance. Accordingly, torque vectoring is applied to improve accuracy related to driving in a curved section. Torque vectoring is a system that allows a car to control the driving force of a specific wheel. Through torque vectoring, it is designed to improve handling, body stability, and performance. Nevertheless, a vehicle is pulled or shaken in a situation where the vehicle is driven on a curved road. Thus, a method for compensating for the issue is required. In addition, the vehicle may be pulled or shaken even in a straight line during acceleration or deceleration. Thus, there is a need for a method for providing a more comfortable ride by solving the issue.

SUMMARY

The present disclosure has been made to solve the above-mentioned problems occurring in the prior art while advantages achieved by the prior art are maintained intact.

Aspects of the present disclosure provide a vehicle behavior control method capable of providing a more comfortable ride in an actual riding position of an occupant, and a computing system and a vehicle supporting the same, unlike an optimized behavior control of a vehicle based on a point of center of gravity (CG) in an existing vehicle control system.

In addition, an aspect of the present disclosure provides a vehicle behavior control method capable of minimizing the behavior of a vehicle at a specific riding position to be suitable for a chauffeur mode (comfort mode) during turning and acceleration/deceleration through an electronic control suspension (ECS) (damping control) actuator and the increase or decrease of the longitudinal force of each of the four wheels. Other aspects of the present disclosure provide a computing system and vehicle supporting the same.

The technical problems to be solved by the present disclosure are not limited to the aforementioned problems. Any other technical problems not mentioned herein should be more clearly understood from the following description by those having ordinary skill in the art to which the present disclosure pertains.

According to an aspect of the present disclosure, a vehicle for receiving vehicle behavior control includes: a sensor device that collects sensing information associated with driving of the vehicle; a processor that performs control associated with an operation of the vehicle; and a storage device that stores at least one instruction for operating the processor. The processor may: select a center of gravity point at which the behavior control for the vehicle is to be performed; set a target roll behavior value and a target pitch behavior value at the selected center of gravity point such that behavior of the selected center of gravity point is less than a predefined reference value; calculate a target roll moment corresponding to the target roll behavior value and a target pitch moment corresponding to the target pitch behavior value; generate a control signal to be transmitted to at least one actuator for following the target roll moment and the target pitch moment; and transmit the control signal to the at least one actuator to perform control such that the behavior at the selected center of gravity point is less than the predefined reference value.

According to an embodiment, the processor may collect the sensing information including four-wheel speed information, lateral acceleration information, pitch rate information, roll rate information, and steering wheel angle information of the vehicle from the sensor device. The processor may also design the target roll behavior value and the target pitch behavior value based on the collected sensing information and the selected center of gravity point.

According to an embodiment, the processor may receive seating detection sensing information from the sensor device and differently select a center of gravity point at which the behavior control is to be performed according to the number of occupants and positions of the occupants based on the seating detection sensing information.

According to an embodiment, the processor may receive seating detection sensing information from the sensor device and select a center of gravity point at which an occupant has been seated, as the selected center of gravity point at which the behavior control is to be performed, based on the seating detection sensing information.

According to an embodiment, the processor may calculate a roll ECS distribution moment and a pitch ECS distribution moment following the target roll moment and the target pitch moment based on an ECS distribution algorithm stored in the storage device in advance. The processor may also calculate a control signal for four-wheel damping force control based on the roll ECS distribution moment and the pitch ECS distribution moment and may transmit the control signal to a suspension device that controls a damping force for each wheel of the vehicle among the actuators.

According to an embodiment, the processor may calculate a roll ECS distribution moment and a pitch ECS distribution moment generated according to application of an ECS distribution algorithm. The processor may also calculate a roll delta moment and a pitch delta moment by subtracting the roll ECS distribution moment and the pitch ECS distribution moment from the target roll moment and the target pitch moment, respectively. The processor may also generate a control signal to be transmitted to at least one of a driving device and a braking device among the actuators by applying the calculated roll delta moment and pitch delta moment to a driving device distribution algorithm.

According to an embodiment, the processor may re-select a center of gravity point at which behavior control for the vehicle is to be performed when at least one of a position of an occupant of the vehicle and the number of occupants of the vehicle is changed.

According to an embodiment, the processor may separate a vertical force and a longitudinal force in consideration of a calculation time for following the target roll moment and the target pitch moment and then perform a calculation for optimization.

According to an aspect of the present disclosure, a vehicle behavior control method includes: selecting, by a processor for controlling driving of a vehicle, a center of gravity point at which behavior control for the vehicle is to be performed; setting a target roll behavior value and a target pitch behavior value at the selected center of gravity point such that behavior of the selected center of gravity point is less than a predefined reference value; calculating a target roll moment corresponding to the target roll behavior value and a target pitch moment corresponding to the target pitch behavior value; generating a control signal to be transmitted to at least one actuator for following the target roll moment and the target pitch moment; and transmitting the control signal to the at least one actuator to perform control such that the behavior at the selected center of gravity point is less than the predefined reference value.

According to an embodiment, the vehicle behavior control method may further include collecting sensing information including four-wheel speed information, lateral acceleration information, pitch rate information, roll rate information, and steering wheel angle information of the vehicle from the sensor device disposed in the vehicle. Setting the target roll behavior value and the target pitch behavior value may include designing the target roll behavior value and the target pitch behavior value based on the collected sensing information and the selected center of gravity point.

According to an embodiment, selecting the center of gravity point may include: receiving seating detection sensing information from the sensor device disposed in the vehicle; and differently selecting a center of gravity point at which the behavior control is to be performed according to the number of occupants and positions of the occupants based on the seating detection sensing information.

According to an embodiment, selecting the center of gravity point may include: receiving seating detection sensing information from the sensor device disposed in the vehicle; and selecting a point at which an occupant has been seated, as the selected center of gravity point at which the behavior control is to be performed, based on the seating detection sensing information.

According to an embodiment, generating the control signal may further include: calculating a roll ECS distribution moment and a pitch ECS distribution moment following the target roll moment and the target pitch moment based on an ECS distribution algorithm stored in the storage device in advance; and calculating a control signal for four-wheel damping force control based on the roll ECS distribution moment and the pitch ECS distribution moment. Performing the control may include transmitting the control signal to a suspension device that controls a damping force for each wheel of the vehicle among the actuators.

According to an embodiment, generating the control signal may include calculating a roll ECS distribution moment and a pitch ECS distribution moment generated according to application of the ECS distribution algorithm. Generating the control signal may also include calculating a roll delta moment and a pitch delta moment by subtracting a roll ECS distribution moment and a pitch ECS distribution moment from the target roll moment and the target pitch moment, respectively Generating the control signal may further include generating a control signal to be transmitted to at least one of a driving device and a braking device among the actuators by applying the calculated roll delta moment and pitch delta moment to a driving device distribution algorithm.

According to an embodiment, the vehicle behavior control method may further include re-selecting a center of gravity point at which behavior control when at least one of a position of an occupant of the vehicle and the number of occupants of the vehicle is changed.

According to an aspect of the present disclosure, a computing system for supporting vehicle behavior control includes a storage device for operation of the system and a processor functionally connected to the storage device. The storage device stores at least one instruction necessary for operating the processor. The at least one instruction may cause the processor for controlling the driving of the vehicle to: select a center of gravity point at which behavior control for the vehicle is to be performed; set a target roll behavior value and a target pitch behavior value at the selected center of gravity point such that behavior of the selected center of gravity point is less than a predefined reference value; calculate a target roll moment corresponding to the target roll behavior value and a target pitch moment corresponding to the target pitch behavior value; generate a control signal to be transmitted to at least one actuator for following the target roll moment and the target pitch moment; and transmit the control signal to the at least one actuator to perform control such that the behavior at the selected center of gravity point is less than the predefined reference value.

According to an embodiment, the at least one instruction may cause the processor to collect sensing information including four-wheel speed information, lateral acceleration information, pitch rate information, roll rate information, and steering wheel angle information of the vehicle from the sensor device disposed in the vehicle. The at least one instruction may also cause the processor to, in relation to setting the target roll and target pitch behavior values, design the target roll behavior value and the target pitch behavior value based on the collected sensing information and the selected center of gravity point.

According to an embodiment, the at least one instruction may cause the processor to, in relation to selecting the center of gravity point, receive seating detection sensing information from the sensor device disposed in the vehicle, and to differently select a center of gravity point at which the behavior control is to be performed according to a number of occupants and positions of the occupants based on the seating detection sensing information.

According to an embodiment, the at least one instruction may cause the processor to, in relation to selecting the center of gravity point, receive seating detection sensing information from the sensor device disposed in the vehicle, and select a point at which an occupant has been seated, as the selected center of gravity point at which the behavior control is to be performed, based on the seating detection sensing information.

According to an embodiment, the at least one instruction may cause the processor to, in relation to generating the control signal: calculate a roll ECS distribution moment and a pitch ECS distribution moment following the target roll moment and the target pitch moment based on an electronic control suspension (ECS) distribution algorithm stored in the storage device in advance; and calculate a control signal for four-wheel damping force control based on the roll ECS distribution moment and the pitch ECS distribution moment for transmission to a suspension device that controls a damping force for each wheel of the vehicle among the actuators. Alternatively, the at least one instruction may cause the processor to, in relation to generating the control signal: calculate a roll ECS distribution moment and a pitch ECS distribution moment generated according to application of the ECS distribution algorithm; calculate the roll delta moment and the pitch delta moment by subtracting the roll ECS distribution moment and the pitch ECS distribution moment from the target roll moment and the target pitch moment, respectively; and generate a control signal to be transmitted to at least one of a driving device and a braking device among the actuators by applying the calculated roll delta moment and pitch delta moment to a driving device distribution algorithm.

BRIEF DESCRIPTION OF THE DRAWINGS

The above and other objects, features, and advantages of the present disclosure should be more apparent from the following detailed description taken in conjunction with the accompanying drawings, in which.

DETAILED DESCRIPTION

Figure 1:
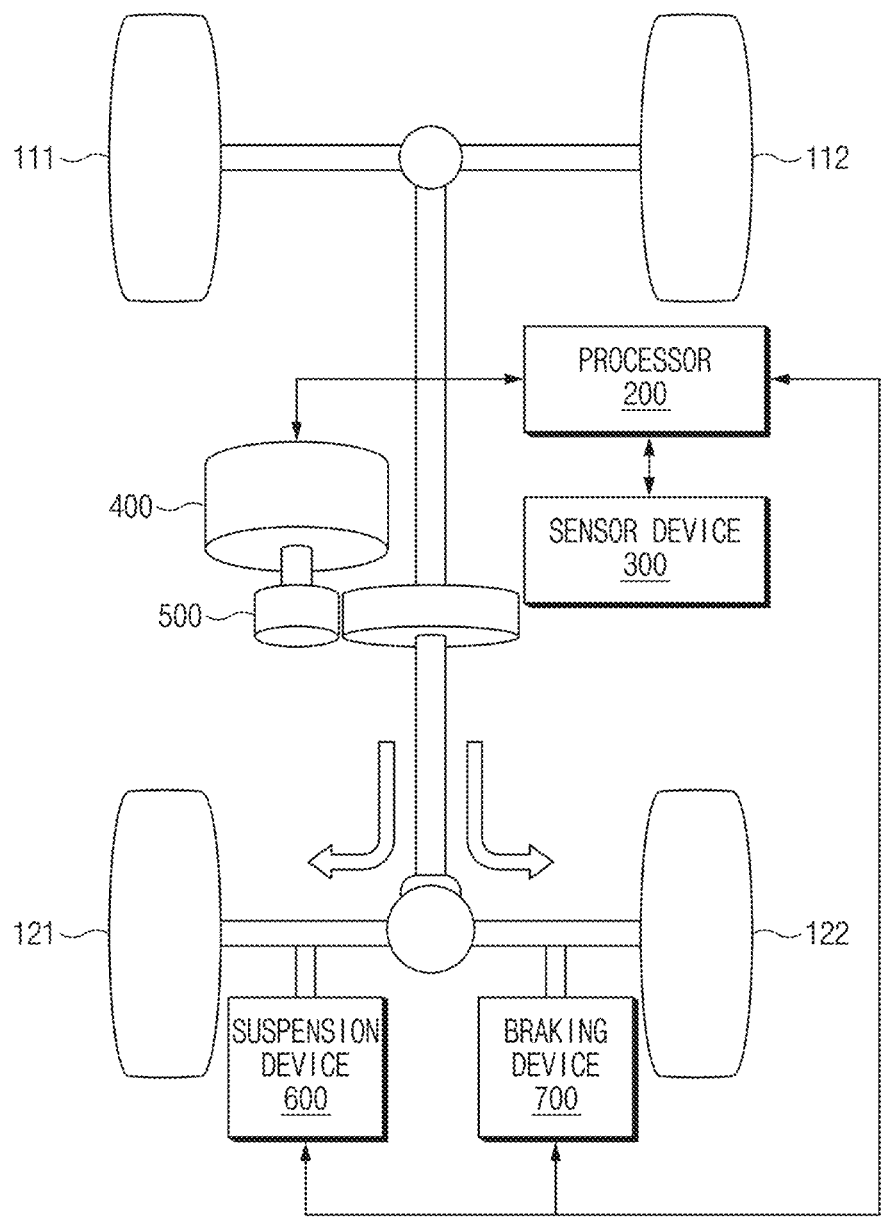
FIG. 1 is a block diagram showing at least some of the configurations of a vehicle supporting vehicle behavior control according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted out in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence, or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application.

Embodiments of the present disclosure are described below in detail with reference to FIGS. 1-11. When a component, device, element, or the like, of the present disclosure, is described as having a purpose or performing an operation, function, or the like, the component, device, or element should be considered herein as being "configured to" meet that purpose or to perform that operation or function.

Figure 2:
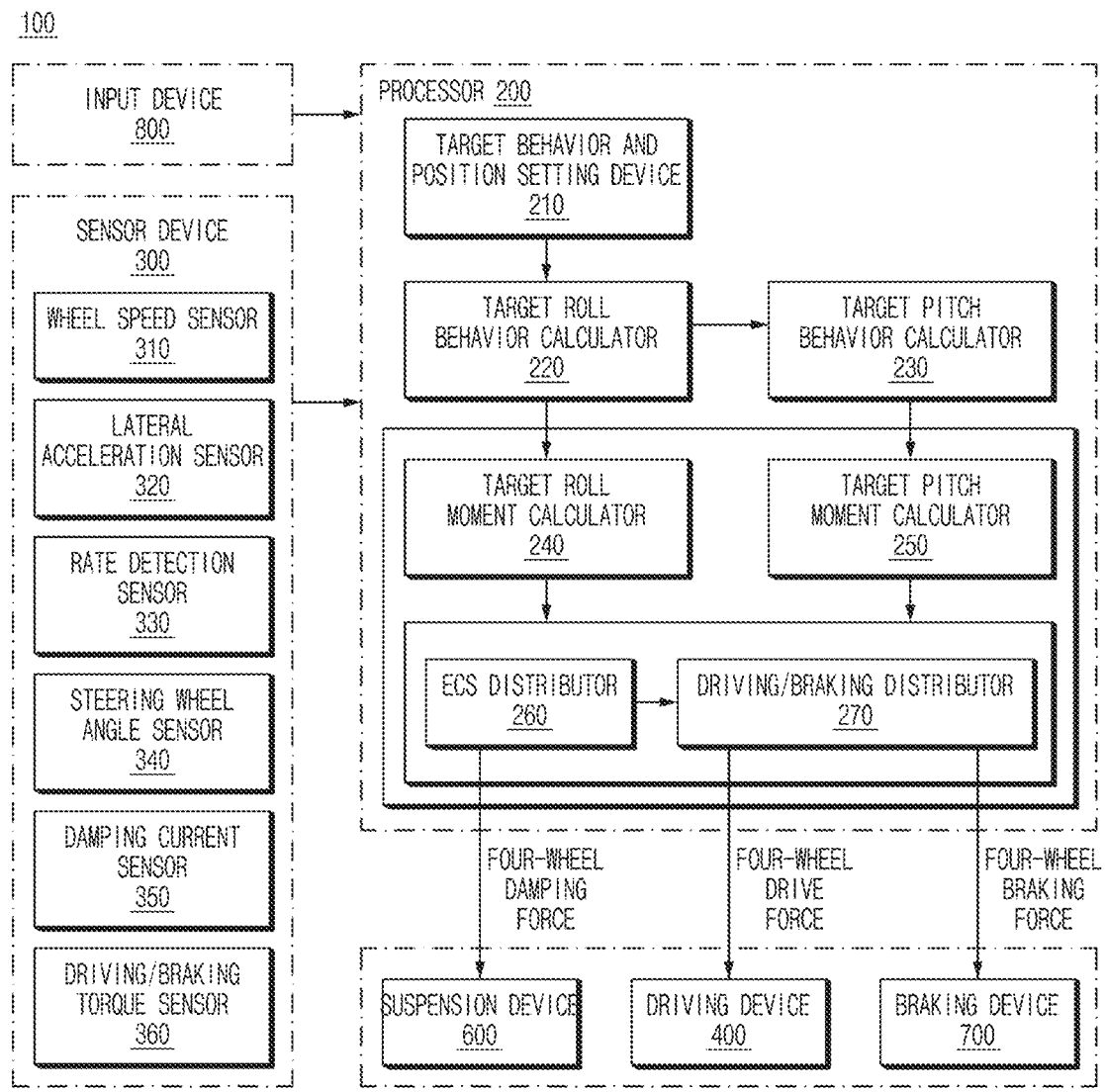
FIG. 2 is a diagram showing a configuration of a sensor device and a configuration of a processor among vehicle configurations according to an embodiment of the present disclosure.

FIG. 1 is a block diagram showing at least some of the configurations of a vehicle supporting vehicle behavior control according to an embodiment of the present disclosure. FIG. 2 is a diagram showing a configuration of a sensor device and a configuration of a processor among vehicle configurations according to an embodiment of the present disclosure.

Referring to FIGS. 1 and 2, a vehicle 100 for supporting vehicle behavior control according to an embodiment of the present disclosure may include front wheels 111 and 112, rear wheels 121 and 122, at least one driving device 400, a deceleration device 500, a suspension device 600 (or an electronic control suspension (ECS)), a braking device 700, a processor 200 (or vehicle controller, or engine controller, or motor controller), and a sensor device 300. In addition, the vehicle 100 may further include connection devices (e.g., shafts and gears) connecting the front wheels 111 and 112 and the driving device 400, wires connecting the processor 200 and the driving device 400, the braking device 700 or the suspension device 600 or the like, wires connecting the sensor device 300 and the processor 200, and connection devices (e.g., shafts and gears) connecting the deceleration device 500, and the front wheels 111 and 112 and rear wheels 121 and 122. In addition, the vehicle 100 may further include a vehicle body, a steering system, and other systems related to supporting various user functions inside the vehicle 100. In addition, the vehicle 100 may further include storage (or memory) for storing data necessary for operating the processor 200 or at least one algorithm. Hereinafter, only at least some components related to vehicle behavior control according to an embodiment of the present disclosure are described as examples.

The front wheels 111 and 112 may include the left front wheel 111 and the right front wheel 112 disposed at the front of the vehicle. The front wheels 111 and 112 may be connected to the driving device 400 (or the deceleration device 500 connected to the driving device 400) individually or through at least one shaft disposed in the front. Accordingly, the front wheels 111 and 112 may be accelerated or decelerated by a driving force transmitted from the driving device 400. In addition, the front wheels 111 and 112 may rotate left or right with reference to the front according to the operation of a steering system (e.g., a steering wheel). The suspension device 600 and the braking device 700 may be connected to each of the front wheels 111 and 112 so that the movement of the front wheels 111 and 112 in the z-axis direction (or up and down movement) and the movement of the front wheels 111 and 112 in the x-axis and y-axis directions (or forward and backward movement, left and right movement) may be controlled. For example, the movement of the front wheels 111 and 112 in x, y, and z-axis directions may be set differently according to at least one of the number of occupants in the vehicle 100 and the position of the occupants. At least one sensor included in the sensor device 300 may be disposed on each of the front wheels 111 and 112 to collect sensing information corresponding to the movement of each of the front wheels 111 and 112. Even in the same driving environment (e.g., the same speed and direction), roll moment and pitch moment applied to the front wheels 111 and 112 may be different, for example, depending on a case where there is an occupant only in a driver's seat and a case where there is an occupant in at least one of rear seats.

The rear wheels 121 and 122 may include the left rear wheel 121 and the right rear wheel 122 disposed at the rear of the vehicle. When the vehicle 100 is a four-wheel drive type, the rear wheels 121 and 122 may be connected to the driving device 400 (or the deceleration device 500 connected to the driving device 400) together with the front wheels 111 and 112 through at least one shaft and at least one gear. In addition, the braking device 700 and the suspension device 600 may be connected to each of the rear wheels 121 and 122. At least one sensor included in the sensor device 300 may be disposed on each of the rear wheels 121 and 122 to collect sensing information corresponding to the movement of each of the front wheels 111 and 112. Each of the rear wheels 121 and 122 may be configured to control the movement of the vehicle differently according to at least one of the positions and the number of occupants in the vehicle 100. Even in the same driving environment (e.g., the same speed and direction), roll moment and pitch moment applied to the rear wheels 121 and 122 may be different, for example, depending on a case where there is an occupant only in a driver's seat and a case where there is an occupant in at least one of rear seats.

For example, when there is an occupant only in the driver's seat, at least one of suspension, driving, and braking control of the front wheels 111 and 112 and the rear wheels 121 and 122 may be performed based on a target moment according to the conventional setting of a center of gravity. As another example, when there are occupants in the driver's seat and the rear left seat, the center of gravity of the vehicle is set to the rear left seat (or the rear left rear wheel), and a target moment may be set such that the behavior (e.g., leaning or shaking) is minimized (or less than a predefined reference value) based on the changed center of gravity. Thereafter, at least one of suspension, driving, and braking control of the front and rear wheels may be performed based on the set target moment. Accordingly, moment control values transmitted to the front wheels 111 and 112 and the rear wheels 121 and 122 may vary according to the number and position of occupants.

The driving device 400 may include a device that generates a driving force for driving the vehicle 100. The driving device 400 may include, for example, at least one of an engine that generates a driving force with a specific fuel, a device that generates power for driving the vehicle 100, and a device that performs charging and discharging of power for driving the vehicle 100. As described above, technology related to vehicle behavior control of the present disclosure is not limited to the type and size of the driving device 400 or the arrangement and number of the driving devices 400 in the vehicle 100 and may be understood as a device capable of generating a driving force capable of rotating at least one of the rear wheels 121 and 122 and the front wheels 111 and 112. The driving device 400 may provide the varying magnitude of a driving force to be transferred to the front wheels 111 and 112 and the rear wheels 121 and 122 according to a control signal transmitted by the processor 200. As an example, the driving device 400 may differently generate and provide a driving force to be transferred to the front wheels 111 and 112 and the rear wheels 121 and 122 according to the positions of the occupants of the vehicle 100 under the same driving conditions (e.g., speed and direction). The driving device 400 may also include a first driving device for driving the front wheels 111 and 112 and a second driving device for driving the rear wheels 121 and 122 to drive the front wheels 111 and 112 and the rear wheels 121 and 122.

The deceleration device 500 may include a device connected to the driving device 400 to reduce speed according to a specific gear ratio in the process of transferring a rotational force generated by the driving device 400 to the gear. The deceleration device 500 may be added or excluded according to changes in the design of the vehicle 100.

The suspension device 600 is an electronically controlled suspension device, which is a system capable of providing ride comfort and steering stability and may make suspension robust in such a way as to make the suspension soft by raising the height of the vehicle body when the road surface is bad and reduce air resistance by lowering the height of the vehicle body when the vehicle is on a highway. The suspension device 600 may include, for example, at least one sensor or a separate sensor included in the sensor device 300, an engine control unit (ECU), and a shock absorber. The suspension device 600 of the present disclosure may change a control amount applied to each wheel according to the number of occupants and the position of the occupants in the vehicle 100. Although only one suspension device 600 is shown in the drawings, the present disclosure is not limited thereto, and a suspension device may be disposed on each wheel (e.g., the front wheels 111 and 112 and the rear wheels 121 and 122). Additionally, or alternatively, the vehicle 100 may include an electronic stability control (ESC) device. Alternatively, the vehicle 100 may include at least one of an ESC and the suspension device 600.

The braking device 700 may reduce rotational speeds of the front wheels 111 and 112 and the rear wheels 121 and 122. The braking device 700 may be a brake system and may be provided to provide different braking forces to wheels respectively. For example, the braking device 700 may include four braking modules (or braking devices) to provide different braking forces to the wheels respectively.

The sensor device 300 may include various sensors to collect various information related to operation of the vehicle 100. For example, the sensor device 300 may include at least one of a sensor capable of sensing a steering angle or a change in steering angle of the vehicle 100, a sensor capable of sensing a change in yaw rate, a sensor capable of detecting a longitudinal speed of the vehicle 100, a sensor capable of detecting a lateral acceleration of the vehicle 100, and a sensor capable of detecting an occupant of the vehicle 100. At least one sensor included in the sensor device 300 may be activated in real-time or at regular cycles according to the control of the processor 200 or according to a change in the movement direction and speed of the vehicle 100 to collect sensing information.

Referring to FIG. 2, the sensor device 300 may include a wheel speed sensor 310, a lateral acceleration sensor 320, a rate detection sensor 330, a steering wheel angle sensor 340, a damping current sensor 350, and a driving/braking torque sensor 360. Additionally, the sensor device 300 may further include a seating detection sensor.

The wheel speed sensor 310 may sense the speed of a wheel included in the wheels. For example, the vehicle 100 may calculate a vehicle speed based on wheel speed sensing information provided by the wheel speed sensor 310.

The lateral acceleration sensor 320 may sense a lateral acceleration of the vehicle 100. For example, while the vehicle 100 drives on a curved road or makes a U-turn, the lateral acceleration sensor 320 may sense the lateral acceleration of the vehicle 100. The lateral acceleration sensor 320 may collect sensing information in real-time or when the vehicle 100 drives on a curved road.

The rate detection sensor 330 may be configured to sense at least one of a roll rate, a pitch rate, and a yaw rate of the vehicle 100. The rate detection sensor 330 may include a roll rate detection sensor, a pitch rate detection sensor, and a yaw rate detection sensor. Alternatively, the rate detection sensor 330 may include a sensor capable of sensing at least two of the roll rate, the pitch rate, and the yaw rate. The rate detection sensor 330 may be disposed at various positions of the vehicle 100, and for example, may be disposed at a point of center of gravity, i.e., a center of gravity point, of the entire vehicle 100.

The steering wheel angle sensor 340 may collect sensing information about the steering state of the vehicle 100. For example, the vehicle 100 may be connected to a steering wheel to detect the rotation of the steering wheel or disposed at a specific point of the wheel of the vehicle 100 to sense information about the steering angle of the vehicle 100 to transmit the sensed information to the processor 200.

The damping current sensor 350 may detect a damping current according to the control of the suspension device 600. The damping current sensor 350 may transfer the detected damping current value to the processor 200.

The driving/braking torque sensor 360 may be disposed to sense a driving torque and braking torque of the vehicle 100. The driving/braking torque sensor 360 may include a driving torque sensor and a braking torque sensor, each of which is adjacent to the driving device 400 and the braking device 700 or an integrated sensor.

When the sensor device 300 further includes a seating detection sensor, the seating detection sensor may collect sensing information about whether there is an occupant in the vehicle 100 and where the occupant is seated and may transmit the collected sensing information to the processor 200. The seating detection sensor may be driven when the ignition of the vehicle 100 is turned on and may collect sensing information about whether an occupant is seated in real-time or according to whether the doors of the vehicle 100 are opened or closed.

An input device 800 may include at least one means for enabling an occupant to input a specific user input through operation. For example, the input device 800 may be configured as a display including a touch screen function and then configured to receive user input through a user interface. Alternatively, the input device 800 may be provided as a physical button or a wheel and may be configured in a form capable of receiving a user input according to an occupant's operation. An occupant may input at least one of the number of occupants or a boarding position in the vehicle 100 using the input device 800. When the vehicle 100 is configured such that the sensor device 300 includes a seating detection sensor to automatically detect the number of occupants and their positions, the configuration of the input device 800 may be omitted.

The processor 200 may transmit, store, or process signals related to the driving control of the vehicle 100. As an example, the processor 200 of the present disclosure may include a target behavior and position setting device 210, a target roll behavior calculator 220, a target pitch behavior calculator 230, a target roll moment calculator 240, a target pitch moment calculator 250, an ECS distributor 260, and a driving/braking distributor 270.

The target behavior and position setting device 210 may set the target behavior and position of the vehicle 100 according to the number of occupants and the position of the occupants in the vehicle 100. For example, when only a driver is in the vehicle 100, the target behavior and position setting device 210 may set the center of gravity of the vehicle 100 to the center of gravity of the entire vehicle 100 and may generate a request message requesting that the target behavior of the vehicle 100 is minimized (or less than a predefined reference value) based on the set center of gravity of the entire vehicle 100. The target behavior and position setting device 210 may set the center of gravity of the vehicle 100 to the rear left seat (or left rear wheel) when there is an occupant in a specific seat (e.g., the rear left seat) of the vehicle 100 and may generate a request message requesting that the target behavior of the vehicle 100 be minimized based on the center of gravity set to the rear left seat of the vehicle 100. The target behavior and position setting device 210 may transmit the generated request message to the target roll behavior calculator 220. The request message may also include sensing information related to the roll behavior and pitch behavior of the vehicle. For example, the request message may include at least a part of longitudinal speed information of the vehicle 100 (e.g., sensing information of the wheel speed sensor 310), lateral acceleration information of the vehicle 100 (e.g., sensing information of the lateral acceleration sensor 320), each rate sensing information of the vehicle 100 (e.g., sensing information of the rate detection sensor 330) and steering wheel angle sensing information.

The target roll behavior calculator 220 may receive a request message from the target behavior and position setting device 210 and obtain information about the center of gravity of the vehicle 100 from the received request message. Also, the target roll behavior calculator 220 may obtain sensing information related to the roll behavior from the request message. For example, the target roll behavior calculator 220 may obtain roll rate sensing information, longitudinal speed information, and the like. The target roll behavior calculator 220 may calculate a target roll behavior value (or a target roll behavior design value, or a roll motion value) considering at least one of driving conditions and the number and position of occupants based on pieces of information obtained from the request message. The target roll behavior calculator 220 may transfer the calculated target roll behavior value to the target roll moment calculator 240. To design the target roll behavior value of the target roll behavior calculator 220, the processor 200 may store an algorithm that is designed such that the roll motion for each center of gravity of the vehicle 100 is minimized (or motion is less than a predefined reference value) according to at least one of the driving conditions of the vehicle 100, the number of occupants, and the boarding position. The processor 200 of the vehicle 100 may calculate a roll motion design value that minimizes the roll behavior according to the current driving conditions of the vehicle 100 and the center of gravity of the vehicle 100 through the operation of the algorithm.

The target pitch behavior calculator 230 may receive a request message from the target roll behavior calculator 220 (or the target behavior and position setting device 210) and may obtain information related to pitch behavior from the received request message. For example, the target pitch behavior calculator 230 may obtain pitch rate sensing information, longitudinal speed information, lateral acceleration sensing information, steering wheel angle information, and the like. The target pitch behavior calculator 230 may calculate a target pitch behavior value (or a target pitch behavior design value, or a pitch motion value) considering at least one of driving conditions and the number and position of passengers based on the pieces of information obtained from the request message. The target pitch behavior calculator 230 may transfer the calculated target pitch behavior value to the target pitch moment calculator 250. To design the target pitch behavior value, the target pitch behavior calculator 230 may operate algorithms designed such that the roll motion for each center of gravity of the vehicle 100 is minimized (or pre-stored such that motion is less than a predefined reference value) according to at least one of the driving conditions of the vehicle 100, the number of occupants, and the boarding position. The processor 200 of the vehicle 100 may calculate a pitch motion design value that minimizes the pitch behavior according to the current driving conditions of the vehicle 100 and the center of gravity of the vehicle 100 through the operation of the algorithm.

The target roll moment calculator 240 may calculate a target roll moment according to the target roll behavior value transmitted from the target roll behavior calculator 220. The target roll moment may be calculated in a predefined manner in relation to the kinematic operation of the vehicle 100, for example. As an example, to calculate a target roll moment, the vehicle 100 may store an algorithm capable of performing an operation according to a specific equation and calculate a target roll moment corresponding to a target roll behavior value through the operation of the algorithm.

The target pitch moment calculator 250 may calculate a target pitch moment according to the target pitch behavior value transmitted from the target pitch behavior calculator 230. To calculate the target pitch moment, the vehicle 100 may store an algorithm capable of performing an operation according to a specific equation and calculate a target pitch moment corresponding to a target pitch behavior value through the operation of the algorithm.

The ECS distributor 260 may receive a target roll moment from the target roll moment calculator 240 and receive a target pitch moment from the target pitch moment calculator 250. The ECS distributor 260 may calculate a roll ECS distribution moment and a pitch ECS distribution moment by distributing the received target roll moment and the received target pitch moment. The ECS distributor 260 may generate a control signal for controlling a four-wheel damping force based on the roll ECS distribution moment and the pitch ECS distribution moment and transmit the generated control signal to the suspension device 600. The suspension device 600 may control a compression degree and a compression speed for the suspension of each wheel according to the control signal for controlling the four-wheel damping force.

The driving/braking distributor 270 may receive the roll ECS distribution moment and the pitch ECS distribution moment calculated by the ECS distributor 260, receive a target roll moment from the target roll moment calculator 240, and receive the target pitch moment from the target pitch moment calculator 250. The driving/braking distributor 270 may calculate a four-wheel driving force and a four-wheel braking force to be supplied to the front wheels 111 and 112 and the rear wheels 121 and 122 through subtraction of the received moment values. The driving/braking distributor 270 may transmit the calculated four-wheel driving force to the driving device 400 and transmit the four-wheel braking force to the braking device 700. The driving device 400 may generate a driving force to be transferred to each wheel according to the transferred four-wheel driving force and transfer the generated driving force to each wheel. Similarly, the braking device 700 may generate a braking force to be transferred to each wheel according to the four-wheel braking force transmitted by the driving/braking distributor 270 and brake the wheels according to the generated braking force.

Figure 3:
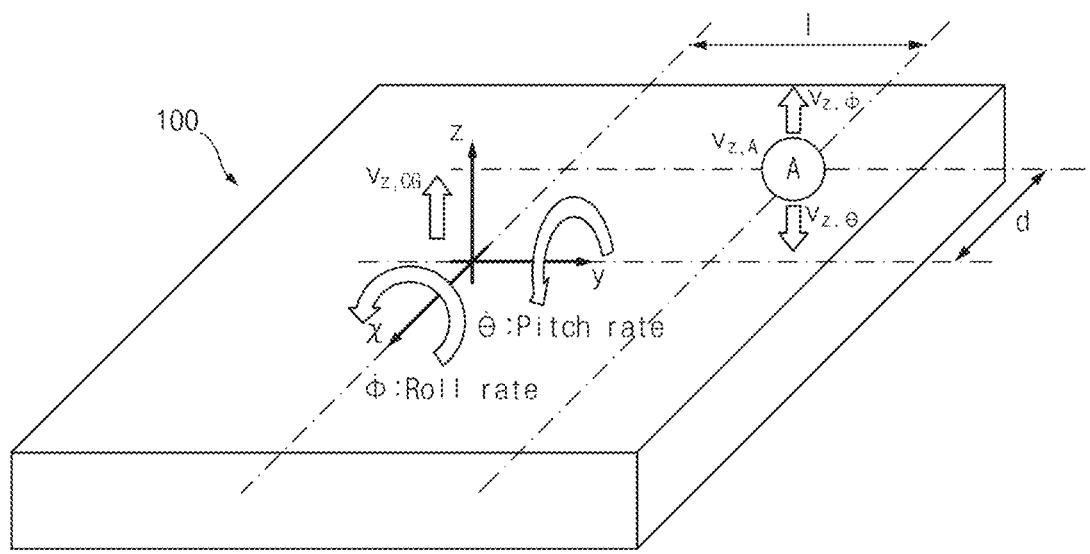
FIG. 3 is a diagram for describing calculation of a pitch behavior of a vehicle based on a boarding position according to an embodiment of the present disclosure.

FIG. 3 is a diagram for describing calculation of a pitch behavior of a vehicle according to a boarding position according to an embodiment of the present disclosure.

Referring to FIG. 3, a center of gravity (CG) of the entire vehicle 100 may be generally located at the center of the vehicle 100, thus, the center behavior speed ($v_{z,CG}$) at the center of gravity of the entire vehicle 100 may be determined by a roll rate ($\dot{\phi}$: roll rate) and a pitch rate ($\dot{\theta}$: pitch rate) of the vehicle 100.

When a specific person other than the driver is riding in the vehicle 100, it is necessary to minimize the behavior at the occupant's position (e.g., minimize shaking or leaning) to provide a more comfortable driving feeling to the occupant. For example, when the occupant is disposed at position A of the vehicle 100, the center motion speed ($v_{z,A}$) at position A may be defined based on the center behavior speed ($v_{z,CG}$) at the center of gravity of the entire vehicle 100 as in the following Equation 1.

$$v_{z,A} = v_{z,CG} + v_{z,\dot{\phi}} + v_{z,\dot{\theta}} \qquad \text{[Equation 1]}$$

In Equation 1, $v_{z,A}$ may be defined as the center behavior speed (or yaw behavior speed) at position A, $v_{z,CG}$ may be defined as the center behavior speed (or yaw behavior speed) at the center of gravity of the entire vehicle 100, $v_{z,\dot{\phi}}$ may be defined as the roll motion speed, and $v_{z,\dot{\theta}}$ may be defined as the pitch behavior speed. When the position of A is spaced apart from the center of gravity of the entire vehicle 100 by "d" (separation distance from the center of gravity of the entire vehicle 100 in the −x-axis direction) and "l" (separation distance from the center of gravity of the entire vehicle 100 in the y-axis direction), the roll behavior speed may be defined as the product of the roll rate and "l", and the pitch behavior speed may be defined as the product of the pitch rate and "d". The roll rate and the pitch rate may be obtained from sensors of the sensor device 300, respectively, and "l" and "d" may be obtained from a seating detection sensor or according to a driver's input.

In the above-described Equation 1, to have a more comfortable driving feeling for the occupant at position A, the processor 200 may perform setting such that a center behavior control value at the center of gravity of the entire vehicle 100 (e.g., the center behavior speed ($v_{z,CG}$) of the vehicle body) and the center behavior control value at the position A (e.g., the center behavior speed ($v_{z,A}$) at the position A) may be identical to each other. In this case, the target pitch behavior may be defined as Equation 2 below.

$$\dot{\theta}_{tar} = -\frac{l}{d} \cdot \dot{\phi}_{tar} \qquad \text{[Equation 2]}$$

where, $\dot{\theta}_{tar}$ may be a target pitch rate, and $\dot{\phi}_{tar}$ may be a target roll rate.

Alternatively, the processor 200 may be set such that the center behavior speed at position A is 0, and in this case, the target pitch behavior may be defined as in Equation 3 below.

$$\dot{\theta}_{tar} = -\frac{1}{d} \cdot \left( v_{z,CG} + l\dot{\phi}_{tar} \right) \qquad \text{[Equation 3]}$$

According to the design of the target roll rate and target pitch rate described above, the processor 200 may define the target roll moment (Mx,tar) and the target pitch moment (My,tar) as in Equation 4 below.

$$M_{x,tar} = K_{P,roll}(\phi_{tar} - \phi_{est}) + K_{D,roll}(\dot{\phi}_{tar} - \dot{\phi}_{est}) \qquad \text{[Equation 4]}$$

$$M_{y,tar} = K_{D,pitch}(\dot{\theta}_{tar})$$

Equation 4 described above is a value using a kinematic relationship for minimization of a vertical velocity at a specific position and may be obtained according to an algorithm implementing a predefined kinematic equation. For example, the $K_P$ and $K_D$ may be compensators (compensation constants) of a PID controller (proportional-integral controller), and a value of est may be a sensing value obtained through current sensing. As described above, the target roll moment and the target pitch moment may be designed in a predefined form according to the position and number of occupants. The designed target roll behavior value and target pitch behavior value may be output through this PID controller. The values transmitted to the suspension device 600, the driving device 400, and the braking device 700 may be values that follow the target roll moment and the target pitch moment. Limitations of each actuator (e.g., at least one of the suspension device 600, the driving device 400 and the braking device 700) are taken into consideration and may be calculated in a form that does not change the vehicle speed.

Figure 4:
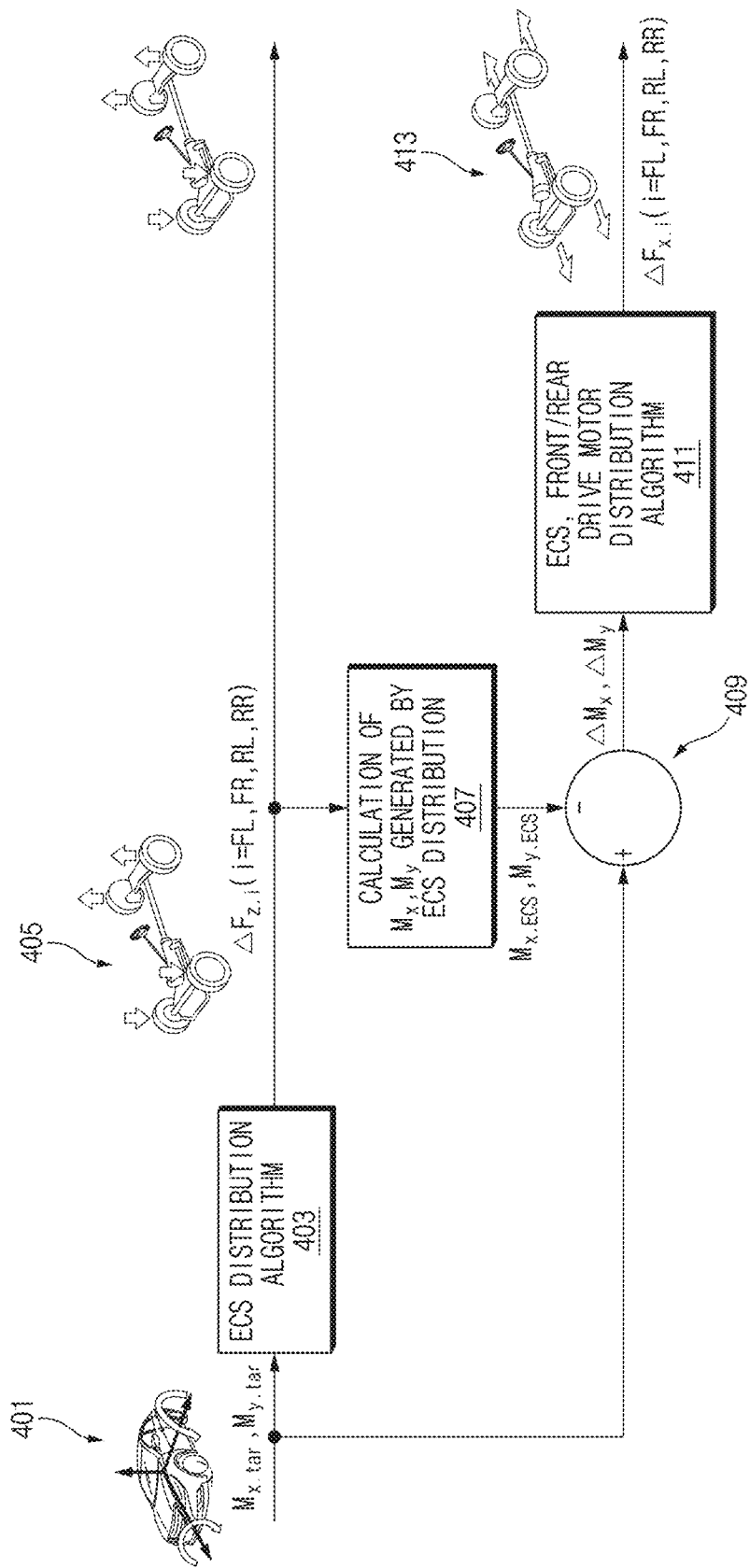
FIG. 4 is a diagram for describing driving and braking control of a vehicle based on designed roll and pitch moments according to an embodiment of the present disclosure.

FIG. 4 is a diagram for describing driving and braking control of a vehicle according to designed roll and pitch moments according to an embodiment of the present disclosure.

Referring to FIGS. 3 and 4, the processor 200 of the vehicle 100 may be configured to separate a vertical force and a longitudinal force in consideration of a calculation time for following a target roll moment and a target pitch moment and perform a calculation for optimization. Specifically, as described above with reference to FIG. 3, the processor 200 may obtain information about the position of the center of gravity of the vehicle 100 whose behavior is to be minimized through the seating detection sensor or the input device 800. The processor 200 may calculate the target roll moment ($M_{x,tar}$) and the target pitch moment ($M_{y,tar}$) corresponding to the obtained position of the center of gravity using a controller (e.g., a PID controller). The controller may be a component included in the processor 200 or a separately provided component.

In 403, the processor 200 may calculate ECS distribution values for the target roll moment ($M_{x,tar}$) and the target pitch moment ($M_{y,tar}$) (e.g., $\Delta F_{z,i}$, where i is additional vertical force applied to FL (front left wheel), FR (front right wheel), RL (rear left wheel), RR (rear right wheel), or the suspension device) by using an ECS distribution algorithm. The processor 200 may provide the ECS distribution value ($\Delta F_{z,i}$) to the suspension device 600 in 405.

Regarding the operation of the ECS distribution algorithm, the processor 200 may perform an operation for optimization that does not consider the limitation in performance of the ECS system (e.g., optimization of non-constraint conditions) based on Equation 5 below.

$$\min_{u} J = s^T Q s + u^T R u \qquad \text{[Equation 5]}$$

where, $u = [F_{b,FL} F_{b,FR} F_{b,RL} F_{b,RR}]$ $$s = \begin{bmatrix} M_{x,tar} - \left\{ \frac{t_f}{2}(F_{d,FL} - F_{d,FR}) + \frac{t_r}{2}(F_{d,RL} - F_{d,RR}) \right\} \\ M_{y,tar} - \{-l_f(F_{d,FL} + F_{d,FR}) + l_r(F_{d,RL} + F_{d,RR})\} \end{bmatrix}$$

$$Q = \begin{bmatrix} q_1 & 0 \\ 0 & q_2 \end{bmatrix}, R = \begin{bmatrix} r_1 & 0 & 0 & 0 \\ 0 & r_2 & 0 & 0 \\ 0 & 0 & r_3 & 0 \\ 0 & 0 & 0 & r_4 \end{bmatrix}$$

In Equation 5, minJ may denote an optimization value, $t_f$ denotes a torque of the front wheels (or a force applied to the front tires), and tr denotes a torque of the rear wheels (or a force applied to the rear tires). Further, $l_f$ denotes a distance from the center of gravity to the front axle and $l_r$ denotes a distance from the center of gravity to the rear axle. Also, $F_{d,i}$ (i is FL, FR, RL, RR) may mean a damping force, $q_1$ may denote a roll weight, and $q_2$ may denote a pitch weight. Equation 5 above may correspond to, for example, an operation for optimizing an additional vertical force ($\Delta F_{z,i}$).

Thereafter, the processor 200 may perform scheduling (e.g., gain scheduling) for the control amount for considering the limitations in performance of the ECS system through Equation 6 below.

$$\text{gain } g = \min\left(\frac{bi}{ai}\right) \qquad \text{[Equation 6]}$$

IN Equation 6, "a" may mean 1st optimization-current state, and "b" may mean ECS max-current state.

In 407, the processor 200 may calculate the roll moment ($M_x$) and the pitch moment ($M_y$) generated by the ECS distribution to obtain the roll ECS distribution moment ($M_{x,ECS}$) and the pitch ECS distribution moment ($M_{y,ECS}$). In state 409, the processor 200 may calculate the roll delta moment ($\Delta M_y$) (or roll difference moment) and pitch delta moment ($\Delta M_x$) (or pitch difference moment) by subtracting the roll ECS distribution moment ($M_{x,ECS}$) and the pitch ECS distribution moment ($M_{y,ECS}$) from the target roll moment ($M_{x,tar}$) and the target pitch moment ($M_{y,tar}$) obtained in state 401, respectively, and transfer the roll delta moment ($\Delta M_x$) and pitch delta moment ($\Delta M_y$) calculated in state 411 to the ESC, front/rear drive motor (or driving device) distribution algorithm. The processor 200 may calculate a delta damping force to be applied to each wheel ($\Delta F_{x,i}$, where i is FL, FR, RL, RR) (or additional vertical force of the wheel, or damping difference value) by applying the roll delta moment ($\Delta M_x$) and the pitch delta moment ($\Delta M_y$) to the drive motor distribution algorithm (or the driving device distribution algorithm). The processor 200 may provide the calculated delta damping force ($\Delta F_{x,i}$) to the driving device 400 and the braking device 700, individually.

The processor 200 may perform roll moment distribution and pitch moment distribution in the process of applying the driving motor distribution algorithm. The processor 200 may calculate a roll moment distribution value through Equation 7 and a pitch moment distribution value through Equation 8 in relation to the calculation of the final control amount related to the control of the driving device 400 and the braking device 700. The processor 200 may then calculate the first control amount through Equations 7 and 8 above. The first control amount may correspond to Equation 9.

$$\Delta M_x = \frac{t_f}{2}(F_{x,Mx,FL}K_{Mx,FL} + F_{x,Mx,FR}K_{Mx,FR}) - \qquad \text{[Equation 7]}$$
$$\frac{t_r}{2}(-F_{x,Mx,RL}K_{Mx,RL} - F_{x,Mx,RR}K_{Mx,RR})$$

In Equation 7, the direction of the force applied to the wheels of the vehicle 100 may satisfy the conditions of $F_{x,FL}=F_{x,RR}$, $F_{x,FR}=F_{x,RL}$, $F_{x,FL}=-F_{x,FR}$.

$$\Delta M_y = -l_f(-F_{x,My,FL}K_{My,F} - F_{x,My,FR}K_{My,F}) + \qquad \text{[Equation 8]}$$
$$l_r(F_{x,My,RL}K_{My,R} + F_{x,My,RR}K_{My,R})$$

In Equation 8, the direction of the force applied to the wheels of the vehicle 100 may satisfy the conditions of $F_{x,FL}=F_{x,FR}$, $F_{x,RL}=F_{x,RR}$, $F_{x,FL}=-F_{x,RL}$.

$$\Delta F_{x,FL,1st} = \Delta F_{x,Mx,FL} + \Delta F_{x,My,FL}, \qquad \text{[Equation 9]}$$
$$\Delta F_{x,FR,1st} = \Delta F_{x,Mx,FR} + \Delta F_{x,My,FR}$$
$$\Delta F_{x,FL,1st} = \Delta F_{x,Mx,FL} + \Delta F_{x,My,RL},$$
$$\Delta F_{x,RR,1st} = \Delta F_{x,Mx,RR} + \Delta F_{x,My,RR}$$

The following Equation 10 is a control ratio, and Equation 11 is a final control amount.

$$\rho = \frac{F_{x,limit}}{\max(|\Delta F_{x,FL,1st}|, |\Delta F_{x,FR,1st}|, |\Delta F_{x,RL,1st}|, |\Delta F_{x,RR,1st}|)} \qquad \text{[Equation 10]}$$

$$\Delta F_{x,FL,comp} = \rho \Delta F_{x,FL,1st}, \Delta F_{x,FR,comp} = \rho \Delta F_{x,FR,1st}, \qquad \text{[Equation 11]}$$
$$\Delta F_{x,RL,comp} = \rho \Delta F_{x,RL,1st}, \Delta F_{x,RR,comp} = \rho \Delta F_{x,RR,1st}$$

The calculation of the final control amount is approached based on the relational expression (linear relational expression between $\Delta F_x - \Delta M_x/\Delta M_y$) dividing the result of subtracting the roll delta moment value ($\Delta M_x$) from the delta damping force ($\Delta F_x$) by the pitch delta moment value ($\Delta M_y$). When there is a constraint condition of $\Sigma_{i=FL\ldots RR}\Delta F_i=0$, the processor 200 may determine $\Delta F_i$ corresponding to $\Delta M_x$ (or $\Delta M_y$). Using this, the processor 200 may calculate the final control amount corresponding to Equation 11 above by summing the vertical force of each wheel corresponding to $\Delta M_x$ and the vertical force of each wheel corresponding to $\Delta M_y$.

On the other hand, in the above linear relational expression, $\Delta M_x$ may be converted into the vertical force ($\Delta F_{x,Mx,i}$) of the wheel corresponding to Mx by Mx distribution, $\Delta M_y$ may be converted into the vertical force ($\Delta F_{x,My,i}$) of the wheel corresponding to My by My distribution, which are then summed to obtain a first control amount ($\Delta F_{x,i,1st}$). In addition, the processor 200 of the vehicle 100 may calculate a final control amount ($\Delta F_{x,i,comp}$) by multiplying a control ratio ($\Delta F_{x,min/max}$) related to optimization with the first control amount.

Figure 5:
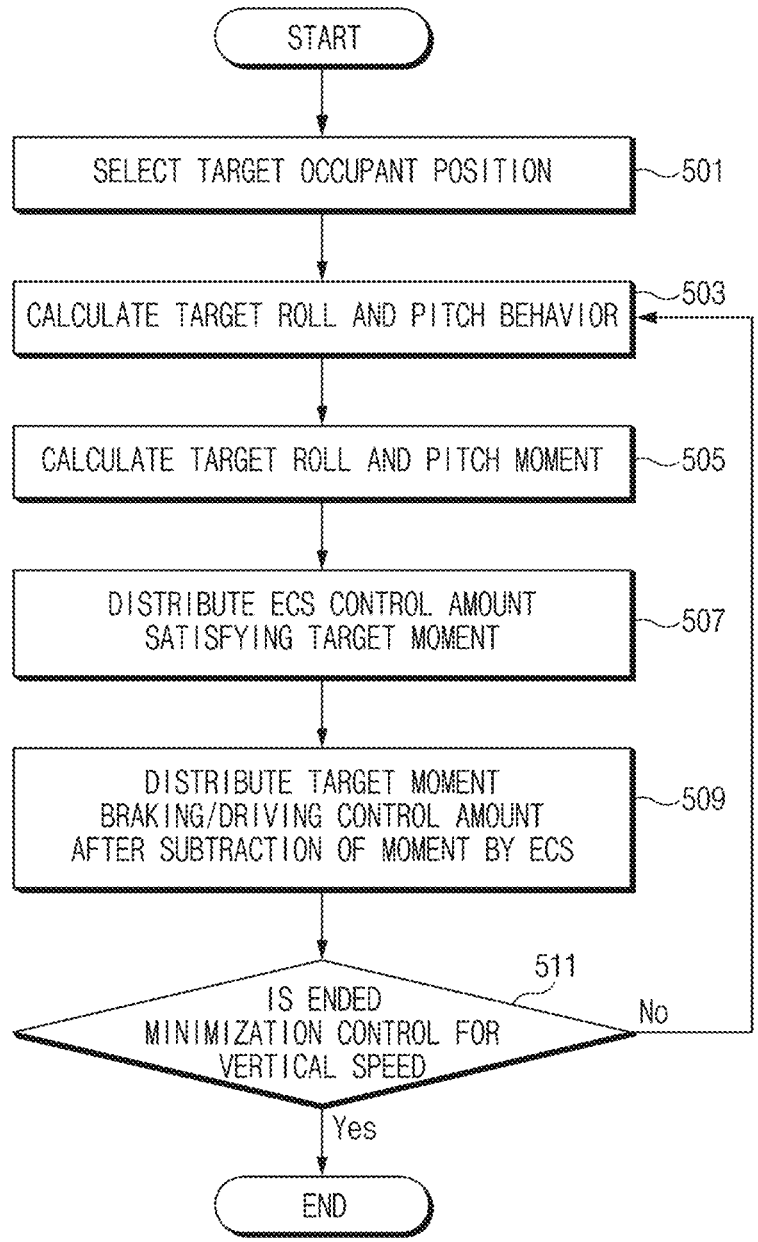
FIG. 5 is a diagram illustrating an example of a vehicle behavior control method according to an embodiment of the present disclosure.

FIG. 5 is a diagram illustrating an example of a vehicle behavior control method according to an embodiment of the present disclosure.

Referring to FIG. 5, in operation 501, the processor 200 of the vehicle 100 may select a target occupant position in association with vehicle behavior control. The processor 200 may analyze the sensing information obtained through a seating detection sensor to identify the position of a target occupant. According to at least one of the positions and the number of occupants, the processor 200 may differently set the target occupant position (or the position of the center of gravity for behavior control).

In operation 503, the processor 200 may calculate target roll and pitch behavior. For example, the processor 200 may calculate a target roll behavior value and a target pitch behavior value based on the point of center of gravity such that the behavior at a point of the center of gravity corresponding to the selected occupant position is minimized. The processor 200 may store and manage target roll behavior values and target pitch behavior values capable of minimizing the behavior at each point of center of gravity of the vehicle 100 in the form of a table or list and calculate the target roll and pitch behavior value based on the stored information. Alternatively, the processor 200 may operate a pre-stored algorithm to calculate target roll and pitch behavior values in real-time according to selection of an occupant position.

In operation 505, the processor 200 may calculate target roll and pitch moment. The processor 200 may perform the calculation by applying the behavior values to the pre-stored algorithm and applying sensing information related to driving collected by at least one sensor included in the sensor device 300.

In operation 507, the processor 200 may perform ECS control amount distribution satisfying the target moment. The processor 200 may calculate an additional vertical force ($\Delta F_{z,i}$) by applying the target moment, i.e., the target roll moment and the target pitch moment to the pre-stored ECS distribution algorithm. The additional vertical force ($\Delta F_{z,i}$) may be applied to the suspension device 600 in addition to the vertical force to be applied to the suspension device 600 according to the current vehicle driving condition (e.g., at least one of longitudinal speed, steering angle, and lateral acceleration).

In operation 509, the processor 200 may distribute the target moment braking/driving control amount after subtraction of the moment by the ECS. The processor 200 may calculate a final control amount by applying a roll delta moment ($\Delta M_x$) and a pitch delta moment ($\Delta M_y$) to a pre-stored drive motor distribution algorithm. The roll delta moment ($\Delta M_x$) and the pitch delta moment ($\Delta M_y$) may be calculated by subtracting the roll ECS distribution moment ($M_{x,ECS}$) and the pitch ECS distribution moment ($M_{y,ECS}$) from the target roll moment ($M_{x,tar}$) and target pitch moment ($M_{y,tar}$) respectively.

In operation 511, the processor 200 may determine whether an event related to the end of minimization control of the vertical speed (or vehicle behavior control) has occurred, and when no end event has occurred, return to operation 503 to re-perform the subsequent operations. For example, the processor 200 may perform an operation of re-selecting a point of center of gravity at which vehicle behavior control is to be performed when at least one of the positions of the occupants of the vehicle and the number of occupants of the vehicle is changed, and then perform operations 503 to 511 again. Alternatively, when a new person gets on board or a person on board gets off, the processor 200 may control to return to operation 501 and perform the subsequent operations again.

The end event may include at least one of, for example, a case where the ignition is turned off, a case where there is no occupant of the vehicle 100, or a driver's end input. When the end event occurs, the processor 200 may end the vertical speed minimization control.

Figure 6:
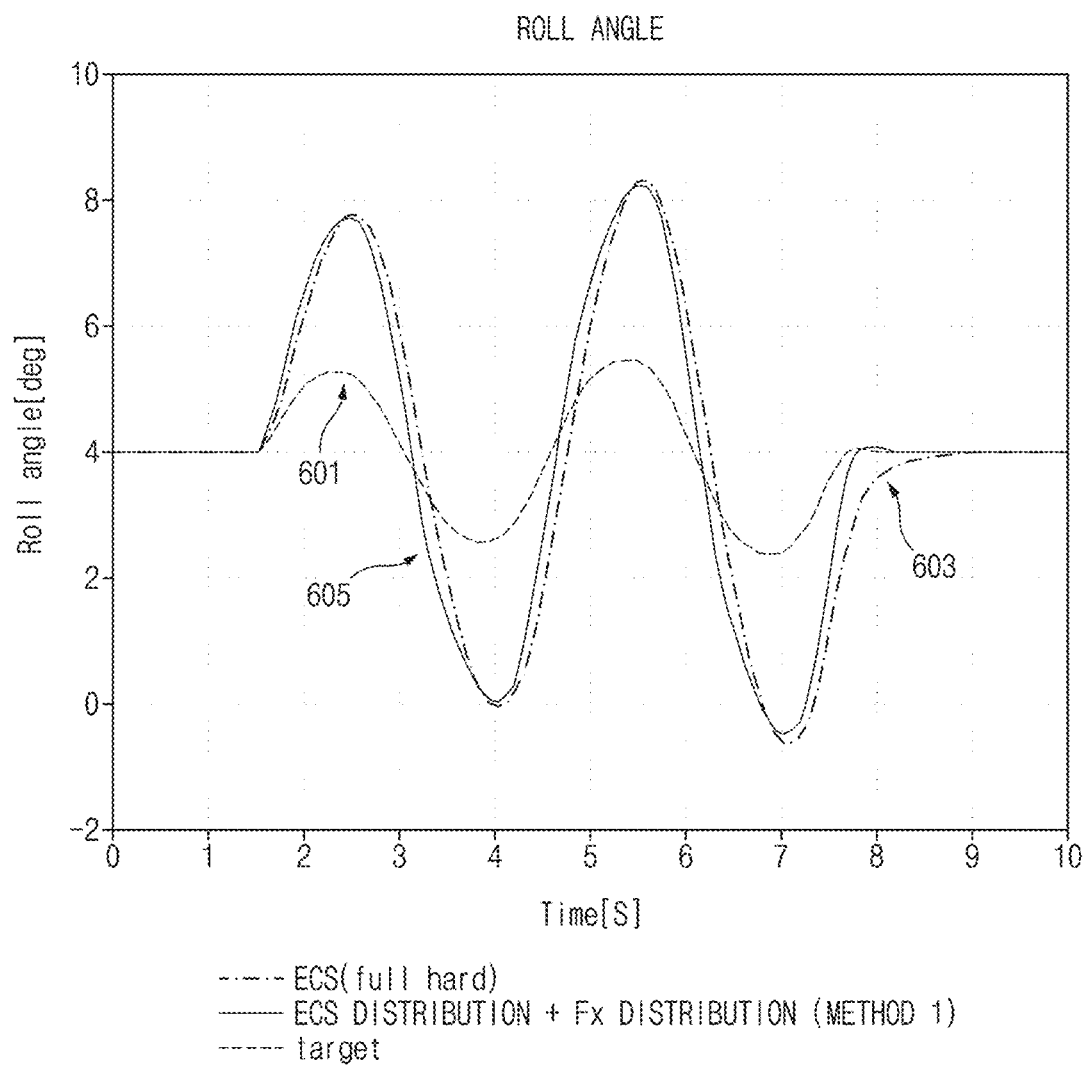
FIG. 6 is a view showing a comparison result of a roll angle during simulation performance comparison.
Figure 7:
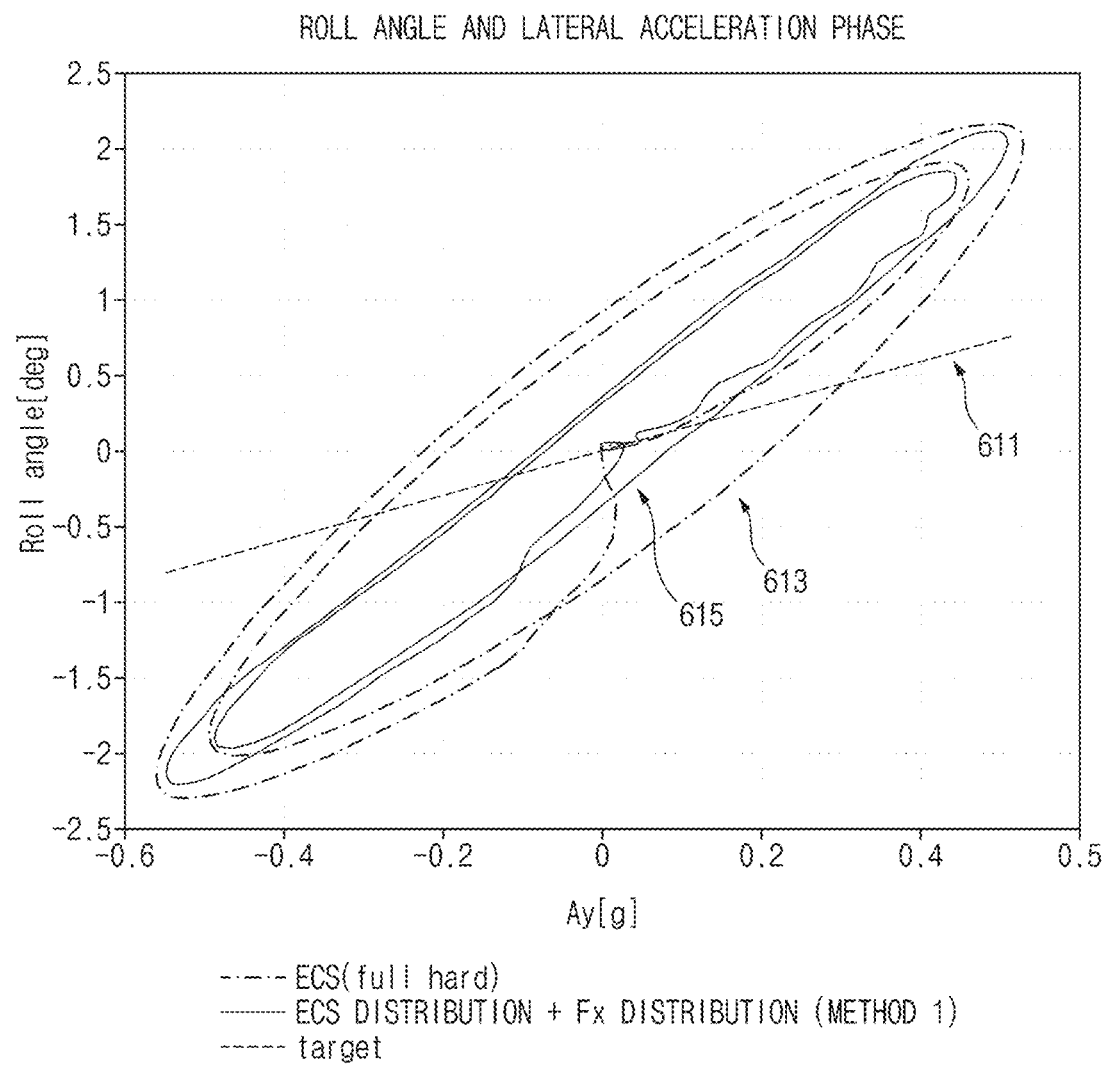
FIG. 7 is a view showing a comparison result of a roll angle and a lateral acceleration phase during simulation performance comparison.
Figure 8:
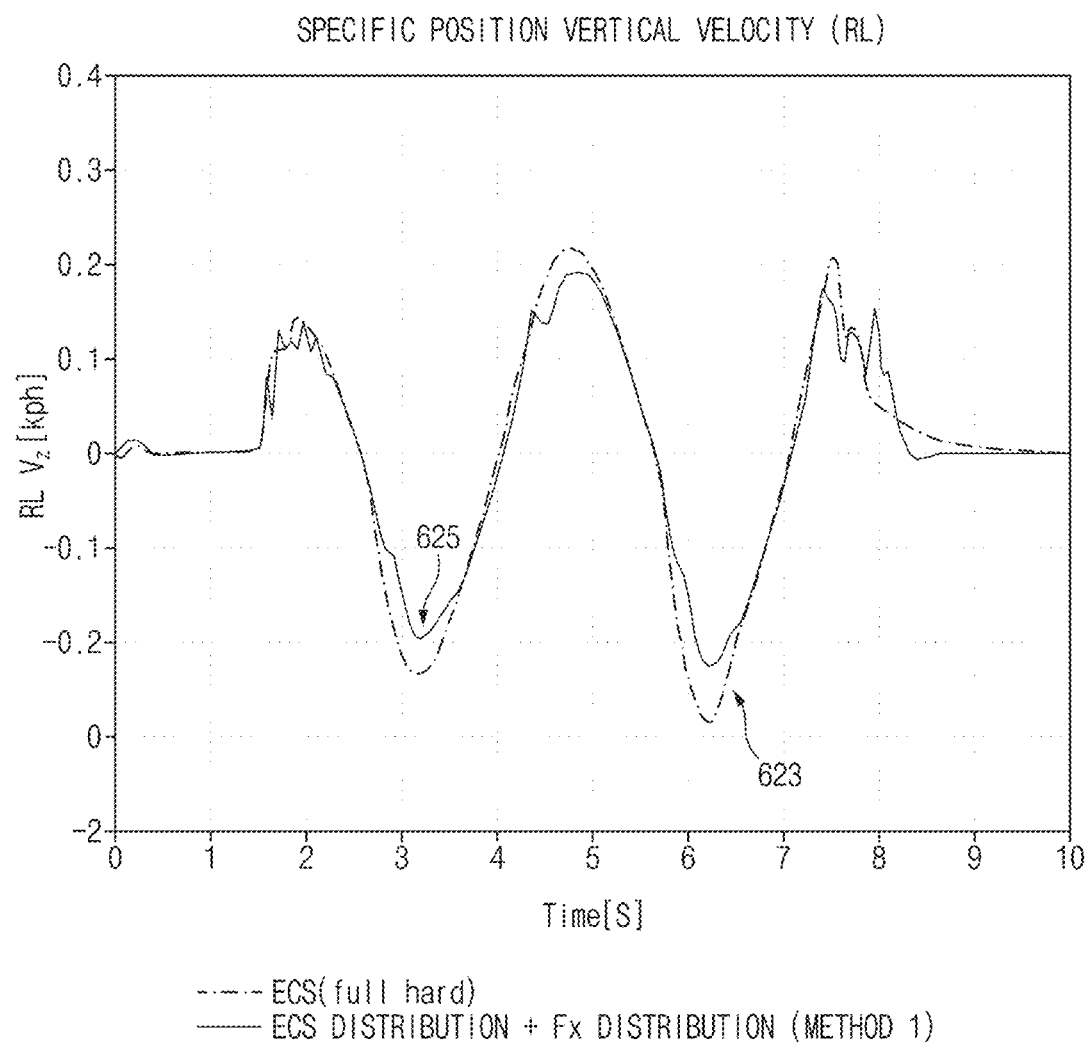
FIG. 8 is a view showing a comparison result of vertical speeds at specific positions during simulation performance comparison.

FIG. 6 is a view showing a comparison result of a roll angle during simulation performance comparison. FIG. 7 is a view showing a comparison result of a roll angle and a lateral acceleration phase during simulation performance comparison. FIG. 8 is a view showing a comparison result of vertical speeds at specific positions during simulation performance comparison.

The simulation environment in FIGS. 6-8 defines, for example, open-loop double sine steering and a left rear seat as a specific position while changing from a 50 kph acceleration environment to a 70 kph acceleration environment.

In FIG. 6, graph 601 is a graph representing a goal (or target) for a roll angle. In FIG. 6, graph 603 shows a change in roll angle during full hard (ECS) control (or conventional general ECS control). In FIG. 6, graph 605 shows a change in roll angle during ECS distribution and $F_x$ distribution (or ECS and follow-up control of driving devices for the target roll moment and target pitch moment according to the present disclosure). It can be seen from FIG. 6 that the graph 605 shows a shape that more follows the target roll angle than the graph 603. Through this, it can be confirmed that the change in roll angle is reduced by adding the $F_x$ control.

In FIG. 7, graph 611 shows a goal (or target) for roll angle and lateral acceleration phase. In FIG. 7, graph 613 shows changes in roll angle and lateral acceleration phase during full hard (ECS) control (or conventional general ECS control). Graph 615 shows changes in roll angle and lateral acceleration phase during ECS distribution and $F_x$ distribution (or ECS and follow-up control of driving devices for target roll moment and target pitch moment of the present disclosure). It can be seen from FIG. 7 that that graph 615 shows a shape that more follows the target roll angle and lateral acceleration phase than graph 613. The reduction in phase difference represented by the above-described graph 615 may be seen as an effect of ECS optimization and addition of $F_x$ control.

In FIG. 8, graph 623 shows a change in vertical speed at a specified position of a vehicle during full hard (ECS) control (or conventional general ECS control). Graph 625 shows a change in vertical speed at a specified position of a vehicle during ECS distribution and $F_x$ distribution (or ECS and follow-up control of driving devices for target roll moment and target pitch moment of the present disclosure). It can be seen from FIG. 8 that the change in vertical speed in graph 625 is reduced compared to the graph 623. The reduction in vertical speed represented by the above-mentioned graph 625 may be seen as an effect of ECS optimization and addition of $F_x$ control.

Figure 9:
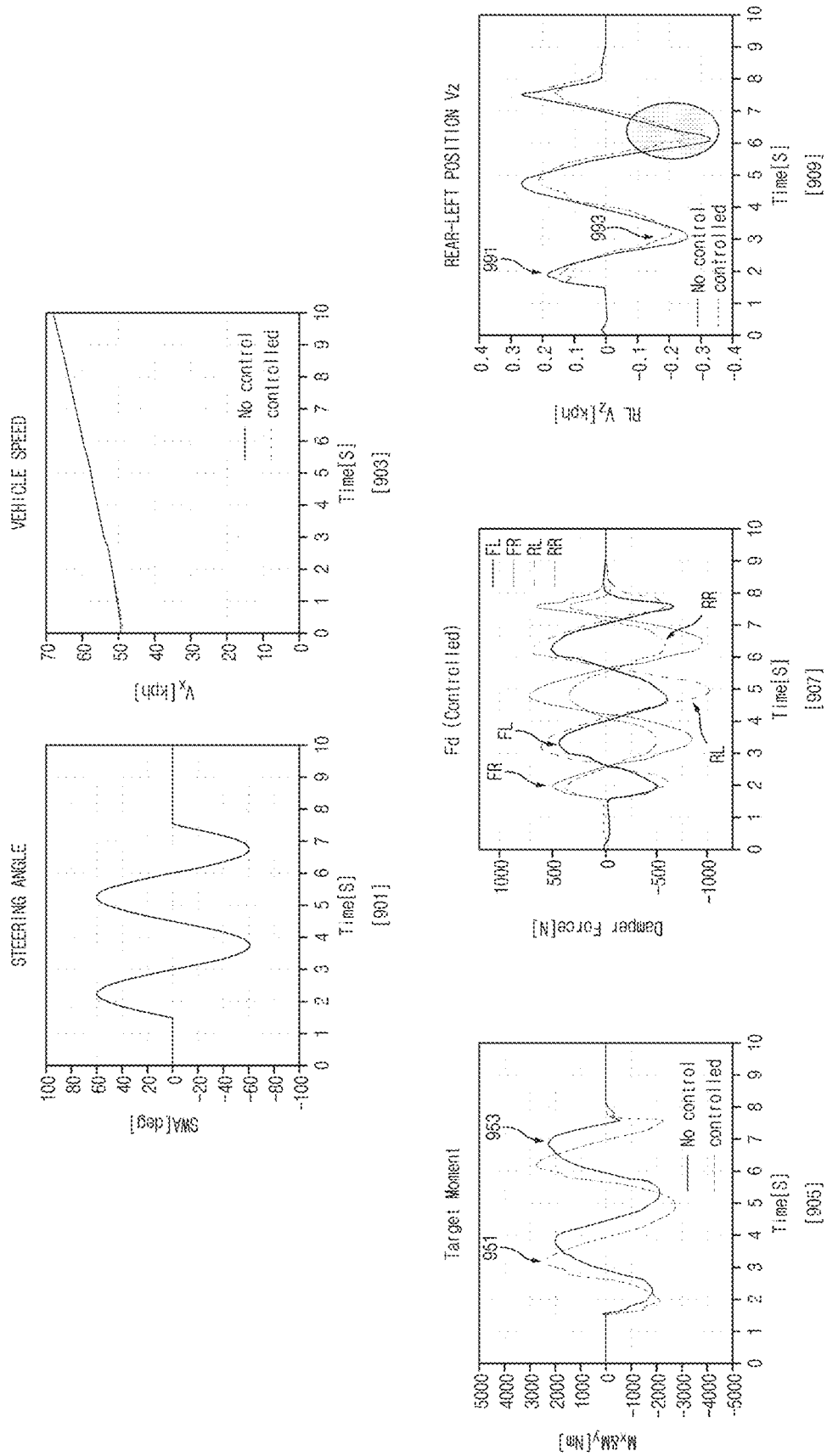
FIG. 9 is a diagram showing an example of an acceleration situation during verification of Carsim® open loop simulation related to the present disclosure.

FIG. 9 is a diagram showing an example of an acceleration situation during verification of Carsim® open loop simulation related to the present disclosure.

Referring to FIG. 9, the Carsim® open loop simulation scenario is an acceleration and double sine wave situation, graph 901 represents a situation in which the steering angle is controlled within a range of 60 degrees to −60 degrees with respect to a peak, and graph 903 represents a situation in which the vehicle is accelerating at an initial vehicle speed of 50 kph. Assuming that the occupant is seated on the left rear seat, the processor 200 of the vehicle 100 may output a target roll moment and a target pitch moment to provide riding comfort by minimizing the behavior at the corresponding position based on the rear left tire which is the center of gravity. Regarding the output of the target moment, in Equation 4 described above, $K_{P,roll}$ may be set to 1200, $K_{D,roll}$ may be set to 450, and $K_{D,pitch}$ may be set to 1200 and in Equation 5, Q value may be set to [100 50] and R value may be set to diag[80 80 80 80].

According to the above setting, the target moment may be set as $M_{x,target}$ (951) and $M_{y,target}$ (953) as shown in graph 905. When the target moment is set, the processor 200 of the vehicle 100 may apply the set target moment to Equations 7 to 11 to calculate damping forces (FL, FR, RL, RR) for each wheel, as shown in graph 907. When the damping forces (FL, FR, RL, RR) are provided to an actuator (e.g., at least one of the suspension device 600, the driving device 400, and the braking device 700), it can be seen from graph 909 that the vertical behavior ($V_z$) at a specific position (e.g., Rear-Left) represents a relatively reduced vertical behavior state (993) compared to the vertical behavior state (991) in a state without separate control. Referring to the drawings, it can be seen that the vertical behavior state 993 with control applied is reduced by about 25.3% compared to the vertical behavior state 991 without control.

Figure 10:
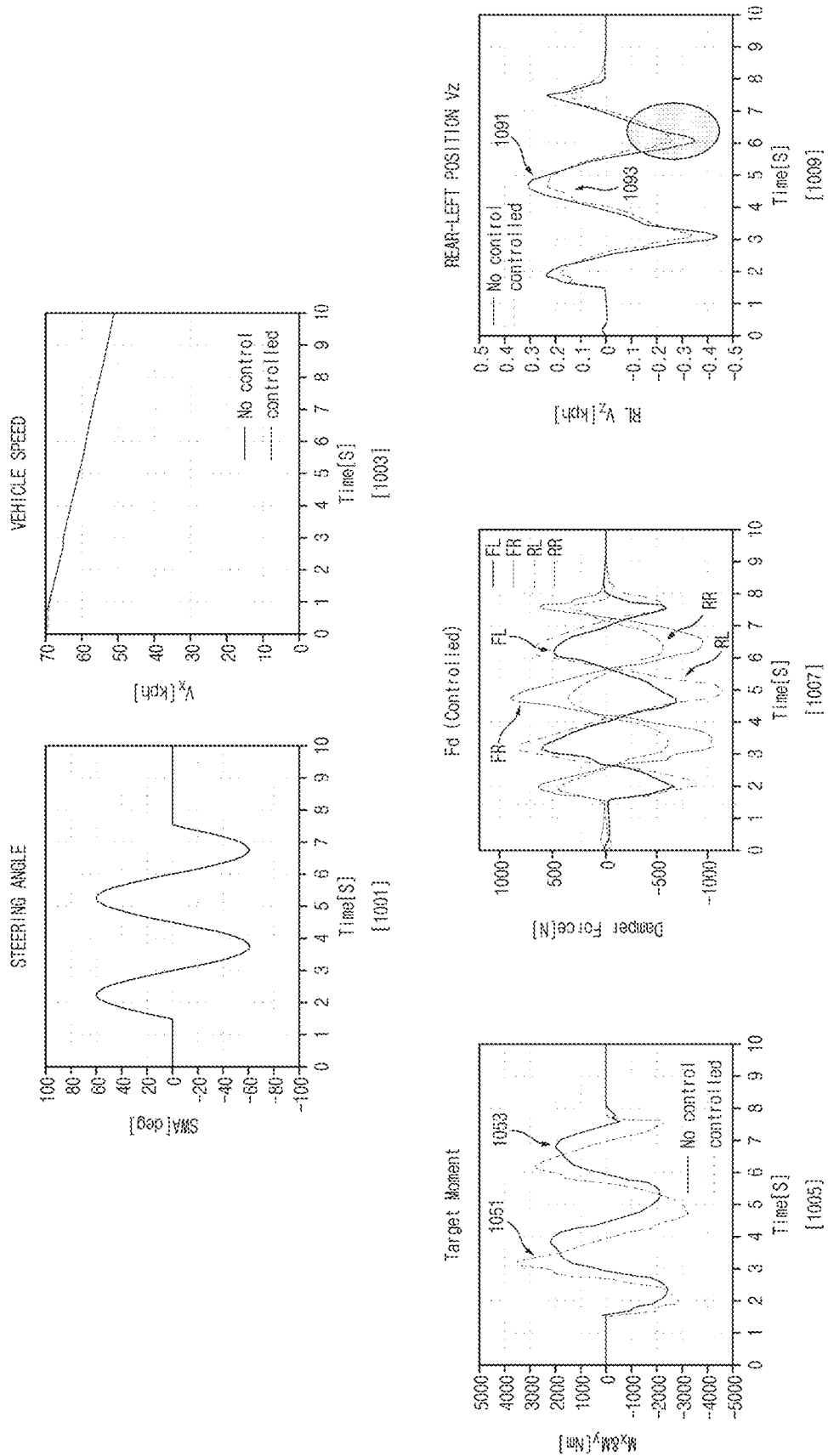
FIG. 10 is a diagram showing an example of a deceleration situation during verification of Carsim® open loop simulation related to the present disclosure.

FIG. 10 is a diagram showing an example of a deceleration situation during the verification of Carsim® open loop simulation related to the present disclosure.

Referring to FIG. 10, the Carsim® open loop simulation scenario is a deceleration and double sine wave situation, graph 1001 represents a situation in which the steering angle is controlled within the range of 60 degrees to −60 degrees with respect to a peak, and graph 1003 represents a situation in which the vehicle is decelerating at an initial vehicle speed of 70 kph. Assuming that the occupant is seated on the left rear seat, the processor 200 of the vehicle 100 may output a target roll moment and a target pitch moment to provide riding comfort by minimizing the behavior at the corresponding position based on the rear left tire which is the center of gravity.

According to the above setting, the target moment may be set as $M_{x,target}$ (1051) and $M_{y,target}$ 1053) as shown in graph 1005. When the target moment is set, the processor 200 of the vehicle 100 may apply the set target moment to Equations 7 to 11 to calculate damping forces (FL, FR, RL, RR) for each wheel, as shown in graph 1007. When the damping forces (FL, FR, RL, RR) are provided to an actuator (e.g., at least one of the suspension device 600, the driving device 400, and the braking device 700), it can be seen from graph 1009 that the vertical behavior (Vz) at a specific position (e.g., Rear-Left) represents a relatively reduced vertical behavior state (1093) compared to the vertical behavior state (1091) in a state without separate control. Referring to the drawings, it can be seen that the vertical behavior state 1093 with control applied is reduced by about 26.6% compared to the vertical behavior state 1091 without control.

Figure 11:
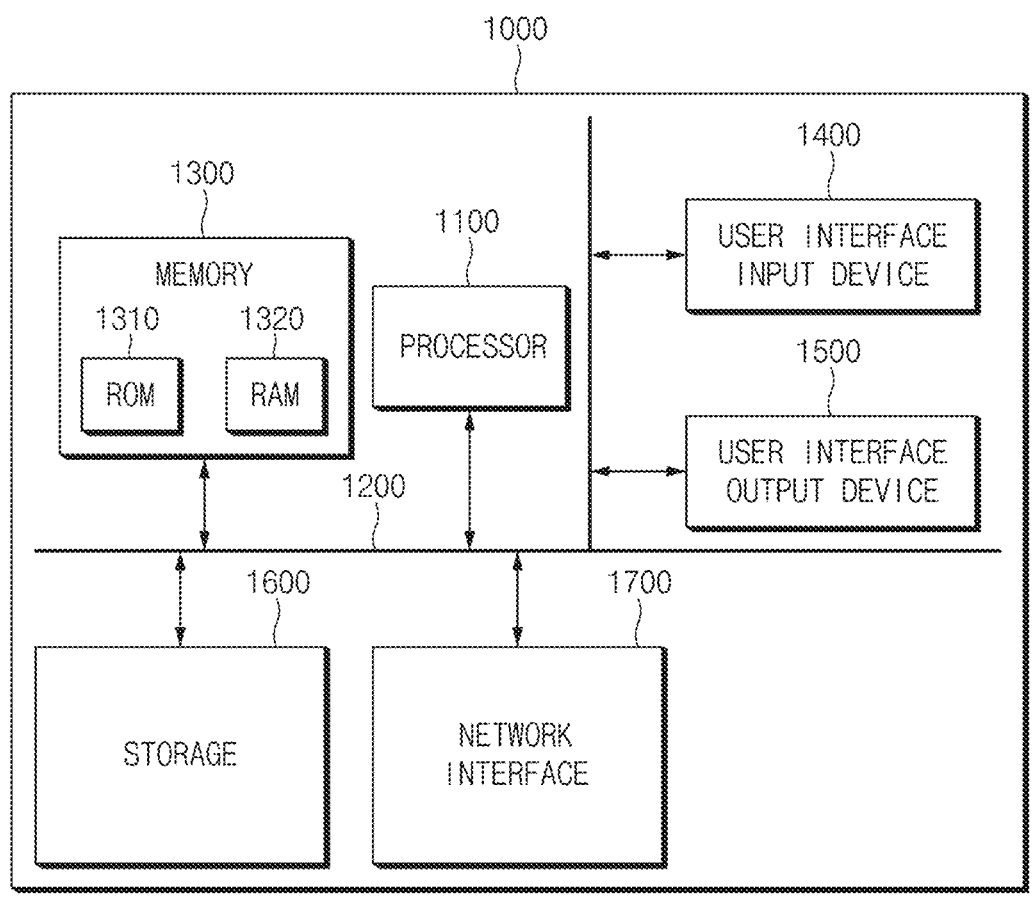
FIG. 11 illustrates a computing system according to one embodiment of the present disclosure.

FIG. 11 illustrates a computing system according to an embodiment of the present disclosure.

Referring to FIG. 11, a computing system 1000 may include at least one processor 1100, a memory 1300, a user interface input device 1400, a user interface output device 1500, storage 1600, and a network interface 1700, which are connected with each other via a bus 1200. The computing system 1000 described in FIG. 11 may be a system to which at least a part of the vehicle 100 described above with reference to FIGS. 1 and 2 are applicable. The computing system 1000 described in FIG. 11 also may be a computing system capable of performing a vehicle behavior control method described in FIG. 5.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random-Access Memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (i.e., the memory 1300 and/or the storage 1600) such as a RAM, a flash memory, a ROM, an EPROM, an EEPROM, a register, a hard disk, a removable disk, and a CD-ROM.

The storage medium may be coupled to the processor 1100. The processor 1100 may read information out of the storage medium and may record information in the storage medium. Alternatively, the storage medium may be integrated with the processor 1100. The processor and the storage medium may reside in an application-specific integrated circuit (ASIC). The ASIC may reside within a user terminal. In another case, the processor and the storage medium may reside in the user terminal as separate components.

The above description is merely illustrative of the technical idea of the present disclosure. Various modifications and variations may be made without departing from the essential characteristics of the present disclosure by those having ordinary skill in the art to which the present disclosure pertains.

Therefore, the purpose of the embodiments of the present disclosure is to explain the spirit and scope of the present disclosure. The purpose of the embodiments of the present disclosure is not to limit the spirit and scope of the present disclosure by the embodiments. The scope of protection of the present disclosure should be interpreted by the following claims. All technical ideas within the scope equivalent thereto should be construed as being included in the scope of the present disclosure.

According to the present disclosure, it is possible to provide a more comfortable ride compared to the prior art when turning or during acceleration/deceleration of the vehicle.

In addition, various effects may be provided that are directly or indirectly understood through the disclosure.

Hereinabove, although the present disclosure has been described with reference to embodiments and the accompanying drawings, the present disclosure is not limited thereto. The disclosed embodiments may be variously modified and altered by those having ordinary skill in the art to which the present disclosure pertains without departing from the spirit and scope of the present disclosure claimed in the following claims.

What is claimed is:

1. A vehicle for receiving vehicle behavior control, the vehicle comprising:
   a sensor device configured to collect sensing information associated with driving of the vehicle;
   a processor configured to perform control associated with an operation of the vehicle;
   a storage device configured to store at least one instruction for operating the processor;
   wherein the processor is configured to
      select a center of gravity point at which the behavior control for the vehicle is to be performed,
      set a target roll behavior value and a target pitch behavior value at the selected center of gravity point such that behavior of the selected center of gravity point is less than a predefined reference value,
      calculate a target roll moment corresponding to the target roll behavior value and a target pitch moment corresponding to the target pitch behavior value,
      generate a control signal to be transmitted to at least one actuator for following the target roll moment and the target pitch moment, and
      transmit the control signal to the at least one actuator to perform control such that the behavior at the selected center of gravity point is less than the predefined reference value.

2. The vehicle of claim 1, wherein the processor is configured to:
   collect the sensing information including four-wheel speed information, lateral acceleration information, pitch rate information, roll rate information, and steering wheel angle information of the vehicle from the sensor device; and
   design the target roll behavior value and the target pitch behavior value based on the collected sensing information and the selected center of gravity point.

3. The vehicle of claim 1, wherein the processor is configured to receive seating detection sensing information from the sensor device and to select a different center of gravity point at which the behavior control is to be performed according to the number of occupants and positions of the occupants based on the seating detection sensing information.

4. The vehicle of claim 1, wherein the processor is configured to receive seating detection sensing information from the sensor device and to select a point at which an occupant has been seated as the selected center of gravity point at which the behavior control is to be performed, based on the seating detection sensing information.

5. The vehicle of claim 1, wherein the processor is configured to:
   calculate a roll electronic control suspension (ECS) distribution moment and a pitch ECS distribution moment following the target roll moment and the target pitch moment based on an ECS distribution algorithm stored in the storage device in advance;
   calculate a control signal for four-wheel damping force control based on the roll ECS distribution moment and the pitch ECS distribution moment; and
   transmit the control signal to a suspension device that controls a damping force for each wheel of the vehicle among the actuators.

6. The vehicle of claim 1, wherein the processor is configured to:

calculate a roll ECS distribution moment and a pitch ECS distribution moment generated according to application of an ECS distribution algorithm;

calculate a roll delta moment and a pitch delta moment by subtracting the roll ECS distribution moment and the pitch ECS distribution moment from the target roll moment and the target pitch moment, respectively; and generate a control signal to be transmitted to at least one of a driving device and a braking device among the actuators by applying the calculated roll delta moment and pitch delta moment to a driving device distribution algorithm.

7. The vehicle of claim 1, wherein the processor is configured to re-select a center of gravity point at which behavior control for the vehicle is to be performed when at least one of a position of an occupant of the vehicle and the number of occupants of the vehicle is changed.

8. The vehicle of claim 1, wherein the processor is configured to separate a vertical force and a longitudinal force in consideration of a calculation time for following the target roll moment and the target pitch moment and then perform a calculation for optimization.

9. A vehicle behavior control method comprising:

selecting, by a processor for controlling driving of a vehicle, a center of gravity point at which behavior control for the vehicle is to be performed;

setting a target roll behavior value and a target pitch behavior value at the selected center of gravity point such that behavior of the selected center of gravity point is less than a predefined reference value;

calculating a target roll moment corresponding to the target roll behavior value and a target pitch moment corresponding to the target pitch behavior value;

generating a control signal to be transmitted to at least one actuator for following the target roll moment and the target pitch moment; and transmitting the control signal to the at least one actuator to perform control such that the behavior at the selected center of gravity point is less than the predefined reference value.

10. The vehicle behavior control method of claim 9, further comprising:

collecting sensing information including four-wheel speed information, lateral acceleration information, pitch rate information, roll rate information, and steering wheel angle information of the vehicle from a sensor device disposed in the vehicle, wherein setting the target roll behavior value and the target pitch behavior value includes designing the target roll behavior value and the target pitch behavior value based on the collected sensing information and the selected center of gravity point.

11. The vehicle behavior control method of claim 9, wherein selecting the center of gravity point includes:

receiving seating detection sensing information from a sensor device disposed in the vehicle; and differently selecting a center of gravity point at which the behavior control is to be performed according to the number of occupants and positions of the occupants based on the seating detection sensing information.

12. The vehicle behavior control method of claim 9, wherein selecting the center of gravity point includes:

receiving seating detection sensing information from a sensor device disposed in the vehicle; and selecting a point at which an occupant has been seated as the selected center of gravity point at which the behavior control is to be performed, based on the seating detection sensing information.

13. The vehicle behavior control method of claim 9, wherein generating the control signal further includes:

calculating a roll electronic control suspension (ECS) distribution moment and a pitch ECS distribution moment following the target roll moment and the target pitch moment based on an ECS distribution algorithm stored in a storage device in advance; and calculating a control signal for four-wheel damping force control based on the roll ECS distribution moment and the pitch ECS distribution moment, wherein performing the control includes transmitting the control signal to a suspension device that controls a damping force for each wheel of the vehicle among the actuators.

14. The vehicle behavior control method of claim 9, wherein generating the control signal includes:

calculating a roll ECS distribution moment and a pitch ECS distribution moment generated according to application of the ECS distribution algorithm;

calculating a roll delta moment and a pitch delta moment by subtracting a roll ECS distribution moment and a pitch ECS distribution moment from the target roll moment and the target pitch moment, respectively; and generating a control signal to be transmitted to at least one of a driving device and a braking device among the actuators by applying the calculated roll delta moment and pitch delta moment to a driving device distribution algorithm.

15. The vehicle behavior control method of claim 9, further comprising:

re-selecting a center of gravity point at which behavior control is to be performed when at least one of a position of an occupant of the vehicle and the number of occupants of the vehicle is changed.

16. A computing system for controlling driving of a vehicle, the computing system comprising:

a storage device for operating the system; and a processor functionally connected to the storage device, wherein the storage device stores at least one instruction necessary for operating the processor, wherein the at least one instruction causes the processor for controlling driving of the vehicle to select a center of gravity point at which behavior control for the vehicle is to be performed, set a target roll behavior value and a target pitch behavior value at the selected center of gravity point such that behavior of the selected center of gravity point is less than a predefined reference value, calculate a target roll moment corresponding to the target roll behavior value and a target pitch moment corresponding to the target pitch behavior value, generate a control signal to be transmitted to at least one actuator for following the target roll moment and the target pitch moment, and transmit the control signal to the at least one actuator to perform control such that the behavior at the selected center of gravity point is less than the predefined reference value.

17. The computing system of claim 16, wherein:

the at least one instruction causes the processor to collect sensing information including four-wheel speed information, lateral acceleration information, pitch rate information, roll rate information, and steering wheel angle information of the vehicle from a sensor device disposed in the vehicle; and the at least one instruction causes the processor to, in relation to setting the target roll and target pitch behavior values, design the target roll behavior value and the target pitch behavior value based on the collected sensing information and the selected point of center gravity.

18. The computing system of claim 16, wherein the at least one instruction, in relation to selecting the center of gravity point, causes the processor to:
   receive seating detection sensing information from a sensor device disposed in the vehicle; and
   differently select a center of gravity point at which the behavior control is to be performed according to a number of occupants and positions of the occupants based on the seating detection sensing information.

19. The computing system of claim 16, wherein the at least one instruction, in relation to selecting the center of gravity point, causes the processor to:
   receive seating detection sensing information from a sensor device disposed in the vehicle; and
   select a point at which an occupant has been seated, as the selected center of gravity point at which the behavior control is to be performed, based on the seating detection sensing information.

20. The computing system of claim 16, wherein the at least one instruction, in relation to generating the control signal, causes the processor to:
   calculate a roll electronic control suspension (ECS) distribution moment and a pitch ECS distribution moment following the target roll moment and the target pitch moment based on an ECS distribution algorithm stored in the storage device in advance and calculate a control signal for four-wheel damping force control based on the roll ECS distribution moment and the pitch ECS distribution moment for transmission to a suspension device that controls a damping force for each wheel of the vehicle among the actuators; or
   calculate the roll ECS distribution moment and the pitch ECS distribution moment generated according to application of the ECS distribution algorithm, calculate a roll delta moment and a pitch delta moment by subtracting the roll ECS distribution moment and the pitch ECS distribution moment from the target roll moment and the target pitch moment, respectively, and generate a control signal to be transmitted to at least one of a driving device and a braking device among the actuators by applying the calculated roll delta moment and pitch delta moment to a driving device distribution algorithm.

* * * * *